United States Patent Office 3,372,205
Patented Mar. 5, 1968

3,372,205
FLUORINATED ALLENES AND PROCESS
FOR PREPARING SAME
Robert E. A. Dear, Convent Station, and Everett E.
Gilbert, Morristown, N.J., assignors to Allied
Chemical Corporation, New York, N.Y., a corporation of New York
No Drawing. Filed Dec. 22, 1966, Ser. No. 603,735
16 Claims. (Cl. 260—653.3)

This invention relates to new fluorinated allenes and more particularly to new fluorinated 2-halomethyl-2,3-butadienes useful as pesticidal fumigants.

The fluorinated 2-halomethyl-2,3-butadienes of our invention have following general formula:

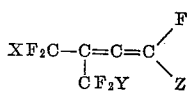

wherein X and Y are the same or different members selected from hydrogen, fluorine and chlorine; Z is hydrogen or chlorine, with the proviso that when both X and Y are hydrogen, Z is also hydrogen.

The fluorinated 2-halomethyl-2,3-butadienes of our invention are prepared by the reaction of sulfur tetrafluoride with a 2-halomethyl-2-hydroxy-3-butyne-2-ol of the formula

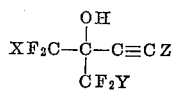

wherein X, Y and Z are as defined above.

The reaction proceeds as follows:

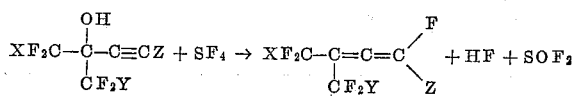

The butyne-ol starting materials can be prepared as described in our copending application Ser. No. 550,113 filed May 16, 1966.

The butyne-ol starting material wherein Z is hydrogen, can be prepared by reacting an ethynyl magnesium halide such as the bromide in a solvent such as tetrahydrofuran, with a fluoroacetone, followed by acid hydrolysis, according to the equation shown below:

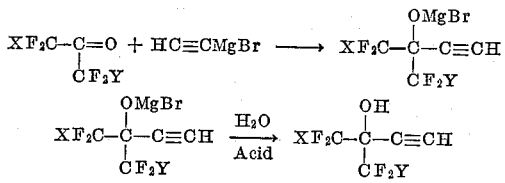

The butyne-ol starting material wherein Z is chlorine can be prepared by reacting a fluoroacetone with a suspension of lithium chloroacetylide in a solvent such as diethyl ether, followed by acid hydrolysis according to the equations shown below.

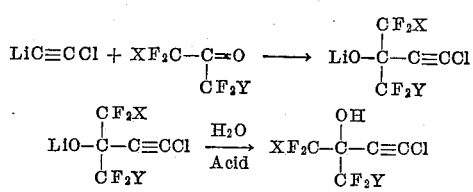

The butyne-ol starting materials described above and claimed in our copending application above referred to are useful as nematocidal fumigants as brought out in the above application. They have, however, very little, if any, activity against the various so-called stored product insects such as the confused flour beetle, the lesser meal worm and the black carpet beetle. Our new allenes, on the other hand, are not only effective against nematodes, but also have strong insecticidal activity on the major stored product insects mentioned above. The new allenes have the further advantage over the alcohols in that they vaporize at lower temperatures than the alcohols and thus affect the insects more rapidly than do the alcohols. A further advantage of the allenes of the instant invention in certain weather-exposed situations, is their relative insolubility in, and nonreactivity with water which renders them more resistant to rain and weathering, whereas the corresponding alcohols are at least somewhat soluble in water and thus tend to be washed away in aqueous systems. A still further advantage of the allenes of the present invention over the starting alcohols, is their chemical neutrality which precludes the appearance of objectionable corrosion problems which might arise in the use of the starting alcohols wherein the hydroxyl function contains a proton which is distinctly acidic in character.

In carrying out the preparation of the new compounds according to the process of our invention, a charge of halomethyl-3-butyne-2-ol is placed in a closed reactor which is then cooled to at least as low as about $-38°$ C. (the boiling point of $SF_4$), preferably to between about $-50°$ C. and $-80°$ C. The reactor is then evacuated, for example, to about 5 to 10 mm. Hg pressure, and sulfur tetrafluoride is fed into the reactor as a gas which condenses in the cold reactor. After the required amount of $SF_4$ has been charged, the reactor is warmed to at least about $0°$ C., preferably to between about $20°$ C. and about $30°$ C. to bring about reaction of $SF_4$ with the alcohol. Temperatures substantially in excess of about $30°$ C. should be avoided as they tend to induce thermal rearrangement of those allenes containing —$CF_2Cl$ groups. The reactor is maintained under superatmospheric pressure during the course of the reaction, the spontaneously developed autogenous pressure of the reaction usually being sufficient, for example between about 25 p.s.i..g and about 75 p.s.i.g. Superatmospheric pressure appears to be essential to the reaction as simply bubbling $SF_4$ gas through a solution of halomethyl-3-butyne-2-ol fails to result in the desired reaction. Reaction is usually complete in a period of between about 2 hours and about 20 hours. Upon completion of the reaction, the product is recovered as by venting the gases, slurrying the liquid reaction product with NaF to remove HF, filtering and distilling. The resulting allene products are low boiling liquids.

The following specific examples further illustrate our invention. Parts are by weight except as otherwise noted.

EXAMPLE 1

*Preparation of 1,1,1-trifluoro-2-trifluoro-methyl-4-fluoro-2,3-butadiene*

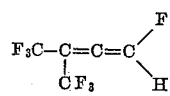

Twenty grams (0.104 mole) of 1,1,1-trifluoro-2-trifluoromethyl-3-bnutyne-2-ol, $(CF_3)_2C(OH)C\equiv CH$, were placed in a stainless steel reactor. The reactor was closed, cooled to $-78°$ C. and evacuated. Then 11.25 grams (0.104 mole) of sulfur tetrafluoride was condensed into the reactor, which was then set aside and allowed to stand at ambient temperature (ca. $20-25°$ C.) overnight. At the end of this 16–18 hour period, the gas in the reactor was vented and the liquid contents were slurried with sodium fluoride to remove hydrogen fluoride, filtered and distilled. There was obtained 9.0 grams of a water white liquid, boiling point 34° C. Elemental analysis, infrared and NMR spectroscopy showed it to be 1,1,-trifluoro-2-trifluoromethyl-4-fluoro-2,3-butadiene.

EXAMPLES 2-7

In the same manner as described in Example 1 above, the butyne-ols listed below were reacted with $SF_4$ in similar proportions to produce the corresponding fluorinated butadiene product.

Example No.:
(2). 1,1 - difluoro - 1,cholo - 2 - chlorodifluoromethyl-3-butylne-2-ol $(CF_2Cl)_2C(OH)C\equiv CH$.
(3). 1,1 - difluoro - 2 - difluoromethyl - 3 - butyne - 2 - ol $(CF_2H)_2C(OH)C\equiv CH$.
(4). 1,1,1 - trifluoro - 2 - trifluoromethyl - 4 - chloro - 3 - butyne-2-ol $(CF_3)_2C(OH)C\equiv CCl$.
(5). 1,1,1 - trifluoro - 2 - chlorodifluoromethyl - 3 - butyne-2-ol $(CF_3)(CF_2Cl)C(OH)C\equiv CH$.
(6). 1,1,1 - trifluoro - 2,2 - difluoromethyl - 3 - butyne-2-ol $(CF_3)(CF_2H)C(OH)C\equiv CH$.
(7). 1,1 - difluoro - 1 - chloro - 2 - difluoromethyl - 3 - butyne-2-ol $(CF_2Cl)(CF_2H)C(OH)C\equiv CH$.

The resulting reaction products and their boiling points are listed below.

| Example No. | Product | Boiling Point, °C |
| --- | --- | --- |
| 2 | 1,1-difluoro-1-chloro-2-chlorodifluoro-methyl-4-chloro-2,3-butadiene $(CF_2Cl)_2C=C=CFH$. | 38 at 57 mm. Hg. |
| 3 | 1,1-difluoro-2-difluoromethyl-4-fluoro-2,3-butadiene $(CF_2H)_2C=C=CFH$. | 32 at 40 mm. Hg. |
| 4 | 1,1,1-trifluoro-2-trifluoromethyl-4-fluoro-4-chloro-2,3-butadiene $(CF_3)_2C=C=CFCl$. | 50. |
| 5 | 1,1,1-trifluoro-2-chlorodifluoromethyl-4-fluoro-2,3-butadiene $(CF_3)(CF_2Cl)C=C=CFH$. | 62. |
| 6 | 1,1,1-trifluoro-2,2-difluoro methyl-4-fluoro-2,3-butadiene $(CF_3)$ $(CF_2H)$ $C=C=CFH$. | 62. |
| 7 | 1,1-difluoro-1-chloro-2-difluoromethyl-4-fluoro-2,3-butadiene $(CF_2Cl)(CF_2H)$ $C=C=CFH$. | 44 at 108 mm. Hg. |

The products of Examples 2 and 5, upon warming, isomerized to the 1,3-butadiene, i.e.

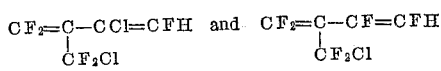

The reaction product of Example 4 was a mixture of 70% $(CF_3)_2C(F)C\equiv CCl$ and 30% of the butadiene product $(CF_3)_2C=C=CFCl$.

Satisfactory elemental analyses were obtained for all the compounds listed above. In addition the infrared and nuclear magnetic resonance spectra (H and F) of the compounds confirmed the assigned structures.

EXAMPLE 8

The compounds of Examples 1-6 were tested for effectiveness in fumigant control of nematodes (*Panagrellus redivivus*), by placing about 100 nematodes in each of several small petri dishes containing 5 ml. of distilled water. The dishes were each placed, open, in a one gallon glass jar. About 0.10 gram or 0.06 gram of the toxicant compound, (the former being equivalent to about 1½ pounds of test compound per 1,000 feet of air, the latter being equivalent to 1 pound of test compound per 1,000 cubic feet of air), was placed in the jar on a cellu-cotton wad or in small container. When the nematode container and the test compound were in place, the jar was sealed. After 24 hours' exposure, the nematode container was removed from the jar and a mortality count was made. Results of this test carried out on the compounds of Examples 1 to 6 inclusive are shown in Table I below.

TABLE I.—NEMATODE FUMIGANT TESTS

| Compound of Example No. | Dosage, Grams Toxicant Per Gallon Jar | Percent Mortality | |
| --- | --- | --- | --- |
| | | 0 Days | 3-4 Days |
| 1 | 0.10 | 60 | 96 |
| 2 | 0.10 | 100 | 100 |
| 3 | 0.06 | 100 | 100 |
| 4 | 0.10 | 20 | 99 |
| 5 | 0.06 | 85 | 100 |
| 6 | 0.06 | 90 | 100 |

EXAMPLE 9

The compounds of Examples 1 to 6 inclusive were tested as fumigants against the three "stored product insects" confused flour beetle adults (*Tribolium confusum*), lesser meal worm adults, (*Alphitobius diaperinus*) and black carpet beetle larvae (*Attagenus piceus*) as follows:

For each test, 10 insects were placed in 1.5 inch diameter salve tins with perforated lids, and an appropriate amount of food was placed in each tin. Then dosages of 0.1 gram of toxicant (equivalent to about 1.5 pounds of test compound per 1,000 cubic feet of air), or less, were placed on a cellucotton wad or in a small open container in a one gallon glass jar. As soon as insect containers and test compounds were introduced, the jars were sealed and allowed to remain for 24 hours' exposure. The insect containers were then removed and mortality counts were made after 5 days. Results of this test carried out on the compounds of Examples 1 to 6 inclusive are shown in Table II below.

TABLE II.—STORED PRODUCT INSECTS—FUMIGANT TESTS

| Compound of Example No. | Dosage, Pounds Per 1,000 cu. ft. | Percent 5-Day Mortality | | |
| --- | --- | --- | --- | --- |
| | | CFB | LMW | BCB |
| 1 | 1.5 | 100 | 100 | 100 |
| 1 | 0.045 | 0 | 60 | 100 |
| 2 | 1.5 | 100 | 100 | 100 |
| 2 | 0.75 | 100 | 100 | 100 |
| 3 | 1.0 | 60 | 100 | 100 |
| 4 | 1.5 | 100 | 100 | 100 |
| 5 | 1.0 | 100 | 100 | 100 |
| 6 | 1.0 | 100 | 100 | 100 |

CFB = Confused flour beetle.
LMW = Lesser meal worm.
BCB = Black carpet beetle.

The alcohols used as starting materials herein are reputed to be inert to many reagents which normally afford replacement of the hydroxyl group. Thus, it has been shown, for example, that $(CF_2Cl)_2C(OH)C\equiv CH$ does not react with concentrated hydrochloric acid, phosphorus trichloride, phosphorus tribromide, phosphorus, iodine, thionyl chloride or the cuprous chloride-hydrochloric acid-sulfuric acid system. All the above reagents normally react with alcohols resulting in replacement of —OH by halogen. Thus the reaction of these alcohols with $SF_4$ according to our invention is doubly unexpected; first, in proceeding at all, and second, in proceeding readily at normally ambient temperatures (Ca. 20-25° C.). In addition the procedure of our invention produces, not only replacement of OH by F, but also a simultaneous rearrangement to the allenic structure. We are aware of no similar rearrangement resulting from reaction with sulfur tetrafluoride.

While the above describes the preferred embodiments of our invention, it will be understood that departures can be made therefrom within the scope of the specification and claims.

We claim:
1. As new compositions of matter, the fluorinated halomethyl butadienes of the formula:

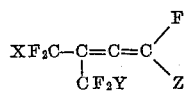

wherein X and Y are the same or different members of the group consisting of hydrogen, fluorine and chlorine, Z is hydrogen or chlorine, and when both X and Y are hydrogen, Z is also hydrogen.

2. The composition of claim 1 wherein X and Y are fluorine and Z is hydrogen.

3. The composition of claim 1 wherein X and Y are chlorine and Z is hydrogen.

4. The composition of claim 1 wherein X, Y and Z are hydrogen.

5. The composition of claim 1 wherein X and Y are fluorine and Z is chlorine.

6. The composition of claim 1 wherein X is fluorine, Y is chlorine and Z is hydrogen.

7. The composition of claim 1 wherein X is fluorine, Y and Z are hydrogen.

8. The composition of claim 1 wherein X is chlorine, Y and Z are hydrogen.

9. The process for preparing fluorinated halomethyl butadiene compounds of the formula:

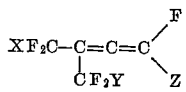

wherein X and Y are the same or different members of the group consisting of hydrogen, fluorine and chlorine, Z is a member of the group consisting of hydrogen and chlorine and when X and Y are both hydrogen, Z is also hydrogen; which comprises contacting a halomethyl-3-butyne-2-ol of the formula:

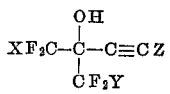

wherein X and Y and Z are as defined above, with a quantity of sulfur tetrafluoride at least about molecularly equivalent to the butyne-ol, at temperatures between about 0° C. and about 30° C. for a period of at least about 2 hours.

10. The process of claim 9 wherein the halomethyl butyne-ol is 1,1,1-trifluoro-2-trifluoromethyl-3-butyne-2-ol.

11. The process of claim 9 wherein the butyne-ol is 1,1-difluoro-1-chloro-2-chlorodifluoromethyl-3-butyne-2-ol.

12. The process of claim 9 wherein the butyne-ol is 1,1-difluoro-2-difluoromethyl-3-butyne-2-ol.

13. The process of claim 9 wherein the butyne-ol is 1,1,1-trifluoro-2-trifluoromethyl-4-chloro-3-butyne-2-ol.

14. The process of claim 9 wherein the butyne-ol is 1,1,1-trifluoro-2-chlorodifluoromethyl-3-butyne-2-ol.

15. The process of claim 9 wherein the butyne-ol is 1,1,1-trifluoro-2,2-difluoromethyl-3-butyne-2-ol.

16. The process of claim 9 wherein the butyne-ol is 1,1,-difluoro-1-chloro-2,2-difluoromethyl-3-butyne-2-ol.

References Cited

UNITED STATES PATENTS 2,980,740   4/1961   Hasek et al. _____ 260—653.3

DANIEL D. HORWITZ, *Primary Examiner.*